US011433922B1

(12) United States Patent
Van Heukelom et al.

(10) Patent No.: US 11,433,922 B1
(45) Date of Patent: Sep. 6, 2022

(54) OBJECT UNCERTAINTY DETECTION

(71) Applicant: Zoox, Inc., Foster City, CA (US)

(72) Inventors: Matthew Van Heukelom, San Francisco, CA (US); Tencia Lee, San Francisco, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 261 days.

(21) Appl. No.: 16/723,937

(22) Filed: Dec. 20, 2019

(51) Int. Cl.
| B60W 60/00 | (2020.01) |
| G05D 1/02 | (2020.01) |
| B60W 50/00 | (2006.01) |
| G06N 20/00 | (2019.01) |

(52) U.S. Cl.
CPC .. *B60W 60/00272* (2020.02); *B60W 50/0097* (2013.01); *B60W 60/0015* (2020.02); *B60W 60/00274* (2020.02); *G05D 1/0214* (2013.01); *G05D 1/0221* (2013.01); *G06N 20/00* (2019.01); *B60W 2050/006* (2013.01); *B60W 2520/105* (2013.01); *B60W 2555/20* (2020.02)

(58) Field of Classification Search
CPC ....... B60W 60/00272; B60W 60/0015; B60W 60/00274; B60W 50/0097; B60W 2555/20; B60W 2050/006; B60W 2520/105; G06N 20/00; G05D 1/0214; G05D 1/0221
See application file for complete search history.

(56) References Cited

U.S. PATENT DOCUMENTS

| 2017/0123419 A1* | 5/2017 | Levinson | G08G 1/165 |
| 2019/0072966 A1* | 3/2019 | Zhang | G08G 1/166 |
| 2019/0367019 A1* | 12/2019 | Yan | G05D 1/027 |
| 2020/0089246 A1* | 3/2020 | Mcgill, Jr. | G06N 5/046 |

* cited by examiner

*Primary Examiner* — Anne Marie Antonucci
*Assistant Examiner* — Jingli Wang
(74) *Attorney, Agent, or Firm* — Lee & Hayes, P.C.

(57) ABSTRACT

Techniques for determining an uncertainty metric associated with an object in an environment can include determining the object in the environment and a set of candidate trajectories associated with the object. Further, a vehicle, such as an autonomous vehicle, can be controlled based at least in part on the uncertainty metric. The vehicle can determine a traversed trajectory associated with the object and determine a difference between the traversed trajectory and the set of candidate trajectories. Based on the difference, the vehicle can determine an uncertainty metric associated with the object. In some instances, the vehicle can input the traversed trajectory and the set of candidate trajectories to a machine-learned model that can output the uncertainty metric.

20 Claims, 8 Drawing Sheets

300 ⇘

304 ⇘

OBJECT UNCERTAINTY DETECTION

BACKGROUND

An autonomous vehicle can use various methods, apparatuses, and systems to guide the autonomous vehicle through an environment. For example, an autonomous vehicle can use planning methods, apparatuses, and systems to determine a drive path and guide the autonomous vehicle through the environment that contains dynamic objects (e.g., vehicles, pedestrians, animals, and the like) and static objects (e.g., buildings, signage, stalled vehicles, and the like). In some instances, dynamic objects can affect an action of the autonomous vehicle as it traverses the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
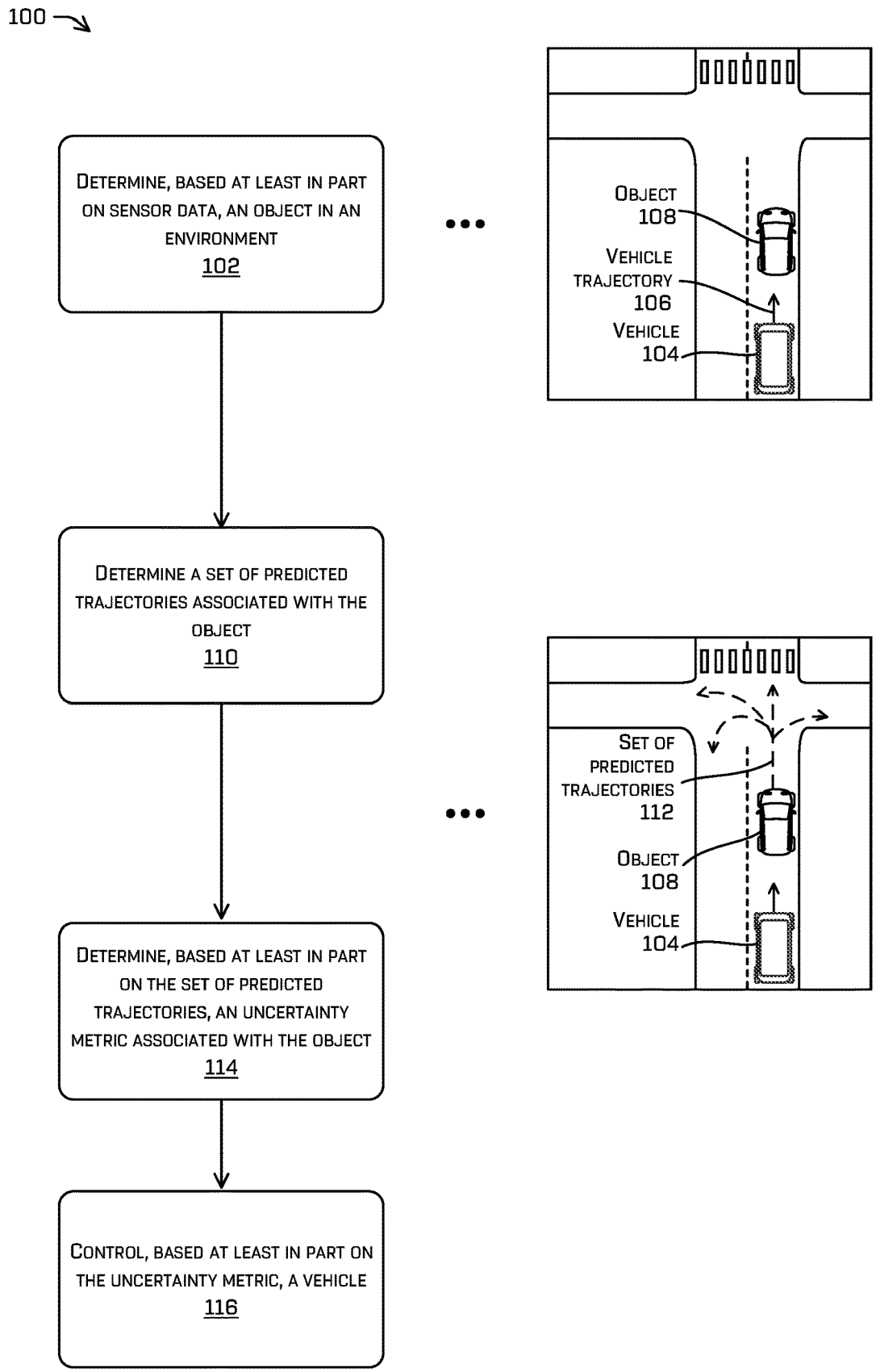
FIG. 1 depicts a pictorial flow diagram for determining an uncertainty metric associated with an object and controlling a vehicle based at least in part on the uncertainty metric.

Techniques for determining an uncertainty metric for an object proximate to a vehicle are discussed herein. For example, as a vehicle traverses an environment, the vehicle can capture sensor data of the environment. The vehicle can detect an object represented in the initial sensor data and determine a classification (e.g., other vehicles, bicycles/bicyclists, motorcycles/motorcyclists, streetcars, trains, pedestrians, animals, debris, and the like) associated with the object. In some examples, based at least in part on the classification, the vehicle can determine a predicted trajectory (or a set of predicted trajectories) for the object, which may represent potential trajectories that can be followed by the object as predicted by the vehicle. In some instances, the vehicle can determine a confidence metric that is associated with a predicted trajectory, which may indicate a level of confidence that the object will follow the predicted trajectory. Based at least in part on the predicted trajectory and the confidence metric, the vehicle can determine an uncertainty metric that is associated with the object that indicates that the object is exhibiting uncertain behavior. Based on the uncertainty metric, the vehicle can generate a trajectory to more safely traverse the environment by avoiding the object and/or maintaining a safe distance from the object. Accordingly, the techniques discussed herein can provide predictions or indications of other vehicles or objects in an environment that may follow an uncertain trajectory to allow a vehicle (such as an autonomous vehicle) to safely traverse an environment.

As discussed above, a computing device of an autonomous vehicle can receive sensor data, (e.g., time-of-flight data, lidar data, radar data, sonar data, and/or the like) to detect an object, which can be a dynamic object, represented in the sensor data of the environment. In some instances, the object can be another vehicle that is traversing the environment, or any other object that is in movement in the environment around the vehicle. For example, the object can be another vehicle such as a car, bus, truck, motorcycle/motorcyclist, streetcar, train, and the like. In some instances, the object can include alternative forms of transportation including personal transporters such as bicyclists, unicyclists, skateboarders, scooters, and electrified/motorized personal transporters. In some instances, the object can include pedestrians or debris.

In some instances, the computing device can determine attribute data that can be associated with the object and/or environment data that can be associated with the environment. The attribute data can include velocity data, acceleration data, and/or pose data (e.g., indicating a position and/or orientation) associated with the object in addition, but not limited to, a classification, extents, tracked history, etc. The velocity, acceleration, and/or pose data can be indicated relative to the autonomous vehicle frame of reference, an environment frame of reference, and/or any other suitable frame. Additionally, or alternatively, the attribute data can include an extent (e.g., length, width, height) of the object and/or object status data (e.g., a headlight and/or turn indicator status, a gesture of an operator of the object, and/or the like). The environment data can include environment state data such as a state of a traffic light, a state of a railroad crossing, a state of a road condition (e.g., the existence of potholes, a tilt of the road, etc.), a state of the weather (e.g., rain, wind, etc.), a time of day, a day of the week, a holiday, a sporting event, regions of the environment associated with traffic incidents, regions of the environment associated with construction and/or development, and the like.

The computing device can determine a set of predicted trajectories associated with the object. In some instances, the set of predicted trajectories can be based on the classification of the object. By way of example and without limitation, the computing device can determine that an object is another vehicle such as a truck. Based on a pose and/or a velocity of the truck, the computing device can determine a set of predicted trajectories that the truck can possibly follow. By way of example and without limitation, the trajectory can include positions that the object is likely to be at in the environment at various times in the future. Such predicted positions can include positional uncertainties, such as a distribution (e.g., a Gaussian distribution) representing a likelihood that the object will be at a location at various times. In some examples, individual trajectories may be associated with an individual likelihood indicating a likelihood that an object may follow a trajectory. In some examples, a predicted trajectory may be based at least in part on a heat map representing prediction probabilities that the object may be at various locations in an environment in the future.

In some instances, the computing device can, based on map data, determine drivable regions and determine trajectories that follow the drivable regions. By way of example and without limitation, the object, such as another vehicle, can approach a junction. The computing device can determine that the object can perform a turning action and follow a trajectory by turning at the junction onto a different road as a predicted trajectory.

As discussed above, the computing device can determine a confidence metric associated with a projected trajectory. In an above where a predicted trajectory indicates that a truck may stop a location that is 15 meters away from a current position of the truck, the computing device can determine that the likelihood of the truck performing that predicted trajectory is low and, therefore, be associated with a low confidence metric. In some examples, the confidence metric can be based at least in part on map data. By way of example and without limitation, a truck on a road without an upcoming stop sign, traffic light, crosswalk, etc. would have few reasons to execute an immediate stop. Therefore, the computing device can determine the low confidence metric associated with the trajectory of the truck stopping within 15 meters of the current location of the truck. In the example above describing the truck approaching a junction, the computing device can determine that the likelihood of the truck performing a turning action is more likely than the truck performing the immediate stop and can be associated with a higher confidence metric.

Based at least in part on the set of predicted trajectories and the set of confidence metrics, the computing device can determine an uncertainty metric associated with the object. By way of example and without limitation, the computing device can compare the set of confidence metrics with a confidence metric threshold. If none of the individual confidence metrics meets or exceeds the confidence metric threshold, the computing device can determine an uncertainty metric with a high value and associate the uncertainty metric with the high value with the object. However, other suitable techniques for determining the uncertainty metric are contemplated.

In addition to, or alternative to, the examples above, a model may be trained to output one or more predicted trajectories associated with an object which, at least in some examples, may comprise inputting a top-down representation of the environment into a learned model. In some such examples, an uncertainty may be output associated with the one or more trajectories. In various examples, such output may comprise an indication that the object is associated with an "unpredictable trajectory" (and/or an associated confidence/uncertainty), the unpredictable trajectory indicative of an erratic behavior of the object or otherwise that the object's behavior deviates from a known motion type.

Using the uncertainty metric, the computing device can determine a trajectory for the vehicle to follow. As discussed above, in the case where the vehicle is an autonomous vehicle, a computing device can control the vehicle to follow a trajectory which can be based on the uncertainty metric. The uncertainty metric can indicate a degree to which an object is behaving unpredictably. By determining the uncertainty metric and/or by determining that the object is an uncertain object, the vehicle can determine a trajectory that avoids a region adjacent to the object, which can reduce a likelihood of a collision. Additionally, by determining the uncertainty metric and/or that the object is an uncertain object or otherwise associated with an unpredictable trajectory, the vehicle can determine a trajectory that maintains a safe distance between the vehicle and the object. Thus, using the uncertainty metric, the trajectory can be a safer and/or a more comfortable trajectory than a trajectory that does not use the uncertainty metric score by accounting for the unpredictability of an object in the environment.

In some examples, an uncertainty metric can be based at least in part on comparing an observed trajectory of an object to a predicted trajectory of an object. If a difference between the observed trajectory and the predicted trajectory meets or exceeds a threshold value (e.g., a difference between an actual position of the object and a predicted position of the object meets or exceeds a threshold distance), the object may be determined to be an uncertain object. Of course, other metrics than distance are contemplated, such as velocity, acceleration, yaw, and the like.

In some examples, other heuristics can be used to determine if an object is an uncertain object. For example, if an object is determined to be a vehicle and a yaw associated with the vehicle is observed to vary above a threshold value within a threshold amount of time, the vehicle may be determined to be an uncertain object. For example, a vehicle may lose control, causing a yaw of the vehicle to change by 270 degrees within a few (e.g., 2 seconds), representing a spin or slide of the vehicle. Such behavior may be indicative of an uncertain object, and an autonomous vehicle can be controlled to stop or maintain a distance away from the vehicle. In some instances, the vehicle can determine a confidence metric associated with a position and/or a velocity of the object. Based at least in part on the confidence metric associated with the position and/or velocity, the vehicle can determine that the object is an uncertain object. By way of example and without limitation, and as discussed above, the vehicle can compare the confidence metric with a confidence metric threshold to determine that the object is an uncertain object.

The techniques discussed herein can improve functionality of a computing device by providing functionality to determine potential outcomes of an object behaving unpredictably, in order to determine a safe and efficient trajectory for controlling a vehicle. Determining an appropriate trajectory for a vehicle according to the techniques disclosed herein in unpredictable scenarios such as those described herein can improve the safety and efficiency of operation of a vehicle. The trajectories determined according to the techniques discussed herein may more nearly approximate or perform better than human reactions to object behavior, and may therefore decrease a probability of a negative safety outcome and increase the efficiency with which the vehicle navigates the environment.

Additionally, the techniques described herein can reduce an amount of required computational resources. For example, a computing device associated with a vehicle can determine one or more trajectories including a avoiding an uncertain object while traversing an environment. The computing device can use a machine-learned model that has been trained based on object trajectories in similar simulated environments to output uncertainty metrics associated with an object in the environment and can have a cost associated with the object. The techniques discussed herein can equip the computing device to determine an appropriate trajectory in difficult uncertain object trajectory determination scenarios based at least in part on the uncertainty metric and reduce an amount of computational resources (e.g., processing power, network utilization, etc.) required to determine the appropriate trajectory in such a scenario.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In one example, similar techniques may be utilized in driver-controlled vehicles in which such a system may provide an indication of whether it is safe to perform various maneuvers. In another example, the systems, methods, and apparatuses can be used in an aeronautical and/or nautical context. Additionally, the techniques described herein can be used with captured data (e.g., captured using sensor(s)), simulated data (e.g., generated by a simulator), or any combination of the two.

FIG. 1 depicts a pictorial flow diagram for determining an uncertainty metric associated with an object and controlling a vehicle based at least in part on the uncertainty metric.

At operation 102 of example process 100, the vehicle 104 can follow a vehicle trajectory 106 while traversing an environment. As the vehicle 104 traverses the environment, the vehicle 104 can capture sensor data of a portion of the environment. Using the sensor data, a computing device of the vehicle 104 can detect an object 108, which can be a dynamic object, represented in the sensor data of the environment. As depicted in FIG. 1, the object 108 can be another vehicle that is approaching an intersection in a same driving lane as the vehicle 104. However, as discussed above, the object 108 can be any number and/or type of objects such as pedestrians, bicycles/bicyclists, motorcycles/motorcyclists, buses, streetcars, trucks, animals, debris and/or the like can be present in the environment and detected by the vehicle 104.

At operation 110, the computing device can determine a set of predicted trajectories 112 associated with the object which, in at least some examples, may comprise an indication of unpredictability associated with an object. In some instances, the set of predicted trajectories 112 can be based on a classification of the object. By way of example and without limitation, the object 108 can be another vehicle and the computing device can determine drivable regions for the vehicle to traverse. In some instances, the computing device can use map data to determine the drivable regions of the environment. Based at least in part on the drivable regions, the computing device can determine the set of predicted trajectories that traverse along the drivable regions where the set of predicted trajectories can include actions such as a stopping action, a proceeding action, an acceleration action, a turning action, a pull over action, a U-turn action, and the like.

By way of another example and without limitation, the object 108 can be a bicyclist and the computing device can determine, for example, regions in the environment for the bicyclist to traverse. For example, the computing device can determine, based at least in part on the map data, bicycle lanes, drivable regions, and sidewalks as regions in the environment for the bicyclist to traverse. The computing device can determine the set of predicted trajectories 112 that follow the regions that include the bicycle lanes, drivable regions, and sidewalks.

By way of another example and without limitation, the object 108 can be a pedestrian and the computing device can determine, for example, regions in the environment for the pedestrian to traverse. For example, the computing device can determine, based at least in part on the map data, regions such as sidewalks, roads, bicycle lanes, crosswalks, and the like as regions for the pedestrian to traverse. Then, the computing device can determine the set of predicted trajectories 112 that traverse through these regions.

By way of another example and without limitation, the object 108 can be debris and the computing device can determine, for example, regions in the environment for the debris to traverse. By way of example and without limitation, the object 108 can be a paint can and the computing device can determine, for example, regions in the environment for the paint can to traverse. For example, the computing device can determine, based at least in part on the map data, a tilt of a road which can affect a trajectory of the paint can. In some instances, the computing device can determine, based at least in part on sensor data, environmental data such as a wind speed, a rain condition, etc. that can affect the trajectory of the paint can. Then the computing device can determine the set of predicted trajectories 112 that traverse through the regions in the environment.

The computing device can be configured to determine a set of confidence metrics associated with the set of predicted trajectories 112 where an individual confidence metric of the set of confidence metrics is associated with an individual predicted trajectory of the set of predicted trajectories 112. A confidence metric can indicate a confidence of the computing device that is associated with the predicted trajectory where a higher confidence metric can indicate that the computing device is more confident that the object 108 will follow the predicted trajectory and a lower confidence metric can indicate that the computing device is less confident that the object 108 will follow the predicted trajectory.

In some instances, the set of confidence metrics can be based at least in part on attribute data associated with the object 108. For example, the attribute data can include velocity data associated with the object 108 and/or acceleration data associated with the object 108. Based at least in part on the attribute data, the computing device can determine a confidence metric associated with a predicted trajectory. By way of example and without limitation, based at least in part on the sensor data, map data, and/or the attribute data, the computing device can determine that the object 108 is approaching a junction and accelerating a velocity of the object 108. The computing device can determine a lower confidence metric associated with a predicted trajectory of the object 108 turning at the junction compared to a confidence metric associated with a predicted trajectory of the object 108 proceeding straight through the junction.

The set of predicted trajectories 112 can represent one or more positions associated with the object 108 over time and associated with, for example, a positional confidence metric. In some instances, an individual predicted trajectory of the set of predicted trajectories can be associated with a set confidence metrics. For example, a predicted trajectory can comprise a first positional confidence metric associated with a first time and a second positional confidence metric associated with a second time. Therefore, the vehicle 104 can determine the set of predicted trajectories 112 where a confidence metric can vary based on a position and/or time along a predicted trajectory. In some instances, the set of predicted trajectories 112 can be based on, or represent by or determined from, one or more heat maps associated with positional probabilities of the object 108 (which may comprise a series of heatmaps indicative of the probabilities at one or more times).

In some instances, the attribute data can indicate the activation of an indicator (e.g., a headlight, a brake light, a turn signal indicator, a hazard light indicator, and the like) of the object 108 and/or a gesture of an operator of the object 108, and/or the like. By way of example and without limitation, a turn indicator of the object 108 can be enabled and the computing device can determine a higher confidence metric associated with a predicted trajectory of the object 108 performing a turning action, a U-turn action, and/or a pull over action compared to a confidence metric associated with a predicted trajectory of the object 108 proceeding straight through a junction. By way of another example and without limitation, the object 108 can be a bicyclist and the computing device can determine a gesture of the bicyclist indicating an intent to turn at an upcoming junction. Therefore, similarly, the computing device can determine a higher confidence metric associated with a predicted trajectory of the object 108 performing a turning action compared to a confidence metric associated with a predicted trajectory of the object 108 proceeding straight through a junction.

In some instances, the attribute data can indicate a make and model of an object 108 such as a vehicle, a type of tire equipped on the object 108, and the like. The computing device can use an object database to determine a capability associated with the object 108 to determine a confidence metric associated with a predicted trajectory. By way of example and without limitation, the computing device can determine that the object 108 is a truck with a specific make and model and the computing device can determine capability data such as, for example, a braking distance at a specific velocity associated with the truck, a turning radius associated with the truck, a maximum lateral grip associated with the truck, and the like. Based at least in part on the capability data, the computing device can determine that a confidence metric associated with a predicted trajectory of the truck that exceeds the capability of the truck as indicated by the capability data is lower than a confidence metric associated with a predicted trajectory that falls within a capability of the truck.

In some instances, the computing device can input, into a machine-learned model, the sensor data, the environment data, the map data, the attribute data, and/or the capability data, and receive from the machine-learned model the set of predicted trajectories 112 and/or the set of confidence metrics associated with the set of predicted trajectories 112. In some instances, the computing device can input the output of a perception system such as perception data (e.g., bounding box data, top-down image data, top-down bounding box data, and the like) into the machine-learned model and receive the set of predicted trajectories 112 and/or the set of confidence metrics associated with the set of predicted trajectories 112. Training the machine-learned model can be based, at least in part, on log data. For example, a vehicle or multiple vehicles can traverse an environment and generate log data associated with the operation of the vehicle(s). The log data can include sensor data captured by one or more sensors of the vehicle, perception data indicating objects identified by one or more systems onboard the vehicle (or produced during a post-processing phase), prediction data indicating an estimated future position, velocity, and/or acceleration of an object (whether produced during the recording or subsequent thereto), and/or status data indicating diagnostic information, trajectory information, headlight and/or turn indicator activation, and/or other information generated by the vehicle. Examples of data generated by a vehicle that can be included in the log data can be found, for example, in U.S. patent application Ser. No. 16/392,094 titled "Scenario Editor and Simulator" and filed Apr. 23, 2019 which is incorporated by reference in its entirety.

In some instances, the log data can additionally or alternatively include simulated log data. For example, the log data can be synthetic log data (or simulated sensor data) generated without the use of a vehicle capturing sensor data of an environment. The synthetic log data can be used to generate a simulated scenario and a simulator can execute the simulated scenario to simulate an autonomous vehicle controller (or a simulated vehicle) operating within the simulated scenario. By executing the simulated scenario, the simulator can generate simulation data that can also be used to train the machine-learning model. To train a machine-learning model, ground truth data can be used which can include manually labeled and/or determined from other, validated, machine-learned components. The ground truth data can indicate objects that are uncertain objects and the log data can include the sensor data and/or the perception data representing a traversed trajectory (or a predicted trajectory). A difference between the log data and the ground truth data can be used to train the machine-learning model to determine the uncertainty metric associated with objects in an environment.

After the machine-learning model is trained, the machine-learned model can output the set of predicted trajectories and/or the set of confidence metrics associated with the set of predicted trajectories At operation 114, the computing device can determine, based at least in part on the set of predicted trajectories, an uncertainty metric associated with the object. For example, the computing device of the vehicle 104 can determine the uncertainty metric based on the set of confidence metrics associated with the set of predicted trajectories 112. By way of example and without limitation, the computing device can compare the set of confidence metrics with a confidence metric threshold. If an individual confidence metric of the set of confidence metrics does not meet or exceed the confidence metric threshold, the computing device can determine an uncertainty metric based at least in part a difference between the individual confidence metric and the confidence metric threshold.

By way of example and without limitation, the confidence metric can be represented as a numeric value with a range of 0 to 1 where a higher value indicates a higher confidence. The set of confidence metrics can include three confidence metrics with the values of: 0.3, 0.2, and 0.5. The confidence metric threshold can be 0.7. The computing device can select the individual confidence metric with the highest value (0.5 in this example) and compare it to the confidence metric threshold (0.7 in this example). After comparing the individual confidence metric with the confidence metric threshold, the computing device can determine that the individual confidence metric with the highest value does not meet or exceed the confidence metric threshold and determine a difference between the individual confidence metric and the confidence metric threshold as the uncertainty metric which can be calculated as 0.2 (0.7-0.5=0.2 in this example). Using the difference between the individual confidence metric and the confidence metric threshold is merely one example and other suitable methods and/or algorithms for determining the uncertainty metric are contemplated. In some instances, the computing device can determine, based on a comparison of the set of confidence metrics and the confidence metric threshold, that the object 108 is an uncertain object. By way of example and without limitation, the computing device can determine that none of the individual confidence metrics of the individual confidence metrics (0.3, 0.2, and 0.5) meet or exceed the confidence metric threshold of 0.7 and determine that the uncertainty metric is 1 indicating that the object 108 is an uncertain object. In instances where at least one of the individual confidence metrics meets or exceeds the confidence metric threshold, the computing device can determine an uncertainty metric of 0 indicating that the object 108 is not an uncertain object.

In some instances, the computing device can input, into a machine-learned model, the set of predicted trajectories and/or the set of confidence metrics and receive from the machine-learned model the uncertainty metric.

By way of example and without limitation, and as discussed above, the uncertainty metric can be a numerical value between 0 and 1 where an uncertainty metric that is close to 1 can indicate higher level of uncertainty associated with the object 108 and where an uncertainty metric that is close to 0 can indicate a lower level of uncertainty associated with the object 108.

In any of the examples above, the uncertainty metric can be combined (e.g., summed) with other scores in order to determine an action for the vehicle 104 to take. As a non-limiting example, though an uncertainty metric can be high (e.g., indicative of an uncertain object), other factors contributing to a total score (e.g., safety, presence of other objects, rules of the road (e.g., not to change lanes in an intersection), etc.) may preclude the vehicle from performing certain actions. Additional details are provided in U.S. patent application Ser. No. 16/539,928 filed on Aug. 13, 2019 entitled "Cost-Based Path Determination," the entire contents of which are hereby incorporated. In such examples, the uncertainty metric can be effectively weighted with respect to any other scores for determining the total score.

As discussed above, training the machine-learned model can be based, at least in part, on log data and ground truth data that indicates an uncertain object in an environment where the ground truth data can include manually labeled and/or determined from other, validated, machine-learned components that indicate objects that are uncertain objects, as described in detail herein.

For example, a vehicle or multiple vehicles can traverse an environment and generate log data associated with the operation of the vehicle(s). The log data can include sensor data captured by one or more sensors of the vehicle, perception data indicating objects identified by one or more systems onboard the vehicle (or produced during a post-processing phase), prediction data indicating an estimated future position, velocity, and/or acceleration of an object (whether produced during the recording or subsequent thereto), and/or status data indicating diagnostic information, trajectory information, headlight and/or turn indicator activation, and/or other information generated by the vehicle.

In some instances, as discussed above, the log data can additionally or alternatively include simulated log data. For example, the log data can be synthetic log data (or simulated sensor data) generated without the use of a vehicle capturing sensor data of an environment. The synthetic log data can be used to generate a simulated scenario and a simulator can execute the simulated scenario to simulate an autonomous vehicle controller (or a simulated vehicle) operating within the simulated scenario. By executing the simulated scenario, the simulator can generate simulation data that can also be used to train the machine-learning model. After the machine-learning model is trained, the machine-learned model can output the uncertainty metric associated with the object 108.

At operation 116, the computing device can control, based at least in part the uncertainty metric, the vehicle. In some instances, the computing device can use an uncertainty metric threshold to determine if the uncertainty metric meets or exceeds the uncertainty metric threshold. If the uncertainty metric meets or exceeds the uncertainty metric threshold, the computing device can control the vehicle to perform an action such as determine a trajectory that avoids the object 108. If the uncertainty metric does not meet or exceed the uncertainty metric threshold, the computing device can refrain from determining the trajectory that avoids the object 108. Examples of generating trajectories to navigate an environment can be found, for example, in U.S. patent application Ser. No. 16/179,711 titled "Cost Scaling in Trajectory Generation" and filed Nov. 2, 2018, which is hereby incorporated by reference in its entirety.

Figure 2:
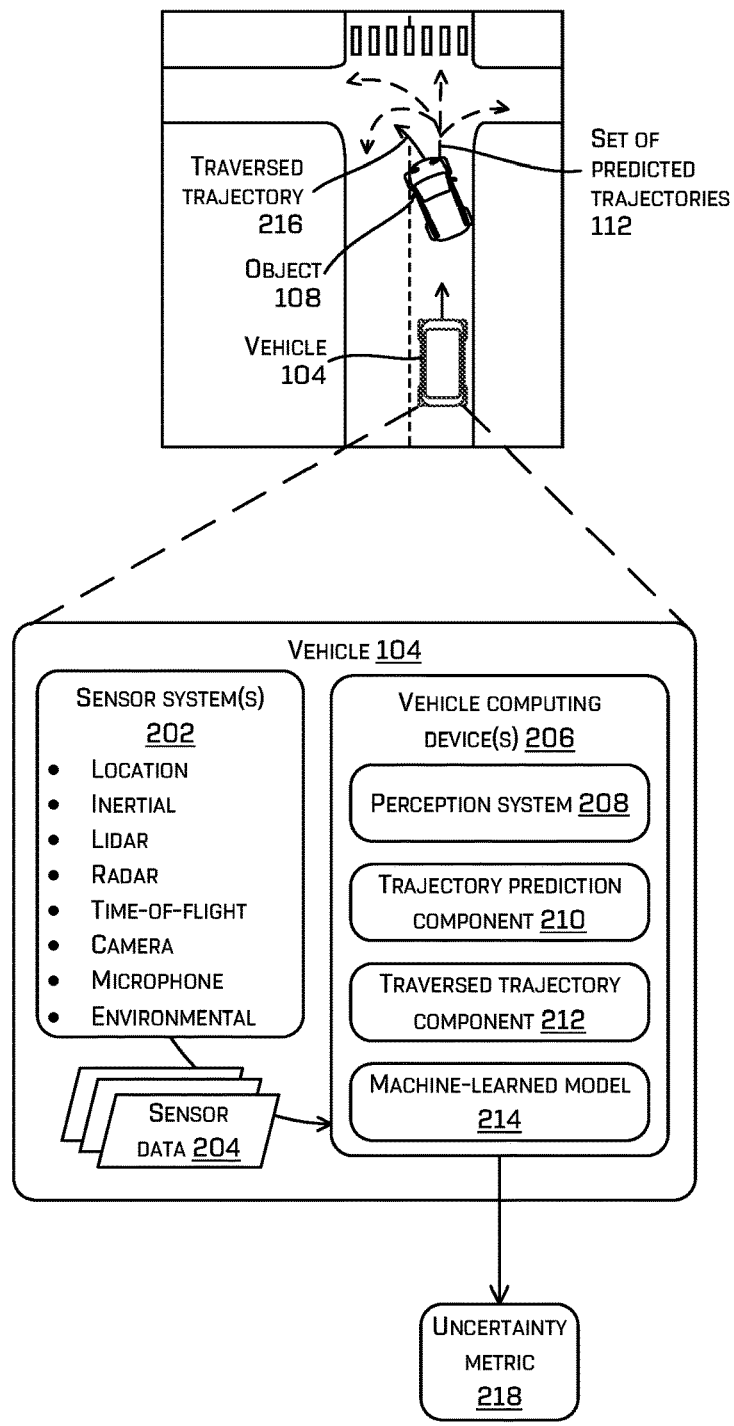
FIG. 2 depicts an example system for determining the uncertainty metric.

FIG. 2 depicts an example system for determining the uncertainty metric. For the purpose of illustration, the vehicle 104 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 104 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. Additional details associated with the vehicle 104 are described below.

In the example 200 of FIG. 2, the vehicle 104 can be associated with sensor system(s) 202. The sensor system(s) 202 can generate sensor data 204, which can be used by vehicle computing device(s) 206 associated with the vehicle 104 to recognize the one or more objects, e.g., the object 108. The sensor system(s) 202 can include, but is/are not limited to, light detection and ranging (LIDAR) sensors, radio detection and ranging (RADAR) sensors, time-of-flight sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, infrared (IR), intensity, depth, etc.), wheel encoders, microphones, environment sensors (e.g., temperature sensors, humidity sensors, light sensors, pressure sensors, etc.), etc.

In at least one example, the vehicle computing device(s) 206 can include a perception system 208, which can perform object detection, segmentation, and/or classification based at least in part on the sensor data 204 received from the sensor system(s) 202. For instance, the perception system 208 can detect the object 108 in the environment based on the sensor data 204 generated by the sensor system(s) 202. Additionally, the perception system 208 can determine an extent (e.g., height, weight, length, etc.), a pose (e.g., x-coordinate, y-coordinate, z-coordinate, pitch, roll, yaw), etc. of the object 108. The sensor system(s) 202 can continuously generate the sensor data 204 (e.g., in near-real time), which can be used by the perception system (and other systems of the vehicle computing device(s) 206).

The vehicle computing device(s) 206 can also include a trajectory prediction component 210, a traversed trajectory component 212, and a machine-learned model 214. The trajectory prediction component 210 can include functionality to determine a set of predicted trajectories 112 associated with the object 108. As discussed above, the trajectory prediction component 210 can determine the set of predicted trajectories 112 based on the classification of the object 108. By way of example and without limitation, the perception system 208 can determine that the object 108 is another vehicle such as a truck. Based on a pose and/or a velocity of the truck, the trajectory prediction component 210 can determine a set of predicted trajectories 112 that the truck can possibly follow. By way of example and without limitation, the trajectory prediction component 210 can determine that the truck, based on the velocity of the truck, has a stopping distance of 15 meters and that the truck can follow a trajectory where the truck stops within 15 meters of its current location as a predicted trajectory.

In some instances, the trajectory prediction component 210 can, based on map data, determine drivable regions and determine trajectories that follow the drivable regions. By way of example and without limitation, the object 108, such as another vehicle, can approach a junction. The trajectory prediction component 210 can determine that the object can perform a turning action and follow a trajectory by turning at the junction onto a different road as a predicted trajectory.

In some instances, the trajectory prediction component 210 can be configured to determine a set of confidence metrics associated with the set of predicted trajectories 112 where an individual confidence metric of the set of confidence metrics is associated with an individual predicted trajectory of the set of predicted trajectories 112. As discussed above, the set of confidence metrics can be based at least in part on attribute data associated with the object 108, sensor data, map data, and/or capability data associated with the object 108.

The traversed trajectory component 212 can be used to determine a traversed trajectory 216 of the object 108. For example, the perception system 208 can capture and/or determine additional sensor data to determine an updated pose, velocity, and the like associated with the object 108. For example, during and/or after a period of time has elapsed after capturing the initial sensor data, the perception system 208 can capture and/or determine additional sensor data. Based on the initial sensor data and the additional sensor data, the perception system 208 can determine a traversed trajectory 216 by determining a difference between an initial position of the object 108 represented in the initial sensor data and an updated position of the object 108 represented in the additional sensor data. By way of example and without limitation, the perception system 208 can compile sensor data over a time window (e.g., 500 milliseconds, 1 second, 3 seconds, 5 seconds, etc.) as a sensor data log.

As discussed above, in some instances, the machine-learned model 214 can be trained to output the set of predicted trajectories 112 and/or the set of confidence metrics wherein each predicted trajectory 112 may be associated with one or more confidences. In some instances, the machine-learned model 214 can be trained to output the uncertainty metric 218 associated with the object 108. As discussed above, the machine-learned model 214 can receive, as input, the set of predicted trajectories 112 and/or the set of confidence metrics and determine an uncertainty metric based at least in part, for example, a difference between the individual confidence metric and a confidence metric threshold.

In some instances, the machine-learned model 214 can be trained to output the uncertainty metric 218 based on receiving, as input, the set of predicted trajectories 112, the set of confidence metrics, and/or the traversed trajectory 216. For example, the machine-learned model 214 can be trained to determine a difference between the traversed trajectory 216 and the set of predicted trajectories 112 to determine the uncertainty metric 218. By way of example and without limitation, the set of predicted trajectories 112 associated with the object 108 can include three trajectories: forward, a 90-degree right turn, and a 90-degree left turn. The traversed trajectory 216 can be a U-turn performed by the object 108 to the left of the object 108. The machine-learned model 214 can determine that the 90-degree left turn trajectory of the set of predicted trajectories 112 is most similar trajectory to the traversed trajectory 216 and, based on a difference between the 90-degree left turn trajectory and the U-turn trajectory, determine the uncertainty metric 218.

The machine-learned model 214 discussed herein may comprise a neural network, which is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. For example, the neural network may include one or more neural networks such as ResNet50, ResNet101, ResNet 152, VGG, DenseNet, PointNet, and the like.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

FIGS. 3A-3D depict various scenarios of determining a set of predicted trajectories based at least in part on a classification of an object.

Figure 3A:
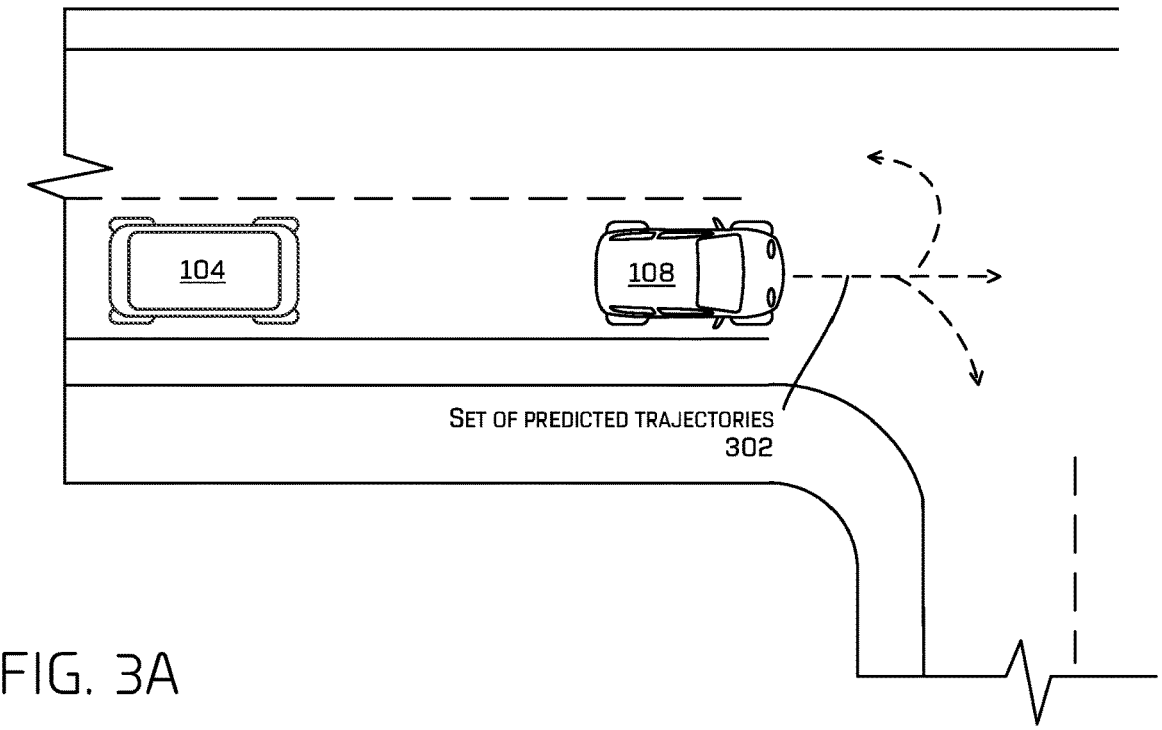
FIGS. 3A-3D depict examples of sets of predicted trajectories associated with various objects in an environment.

FIG. 3A depicts an example 300 of a vehicle 104 traversing an environment and that includes a T junction. In the environment, the vehicle 104 can detect an object 108 which can be another vehicle. Based at least in part on the vehicle classification of the object 108, the vehicle 104 can determine the set of predicted trajectories 302 which can include the object 108 performing a U-turn at the junction, proceeding straight through the junction, or performing a right turn at the junction. As discussed above, the vehicle 104 can determine the set of predicted trajectories 302 based at least in part on the map data by determining that the object 108 will traverse along drivable regions of the environment.

Figure 3B:
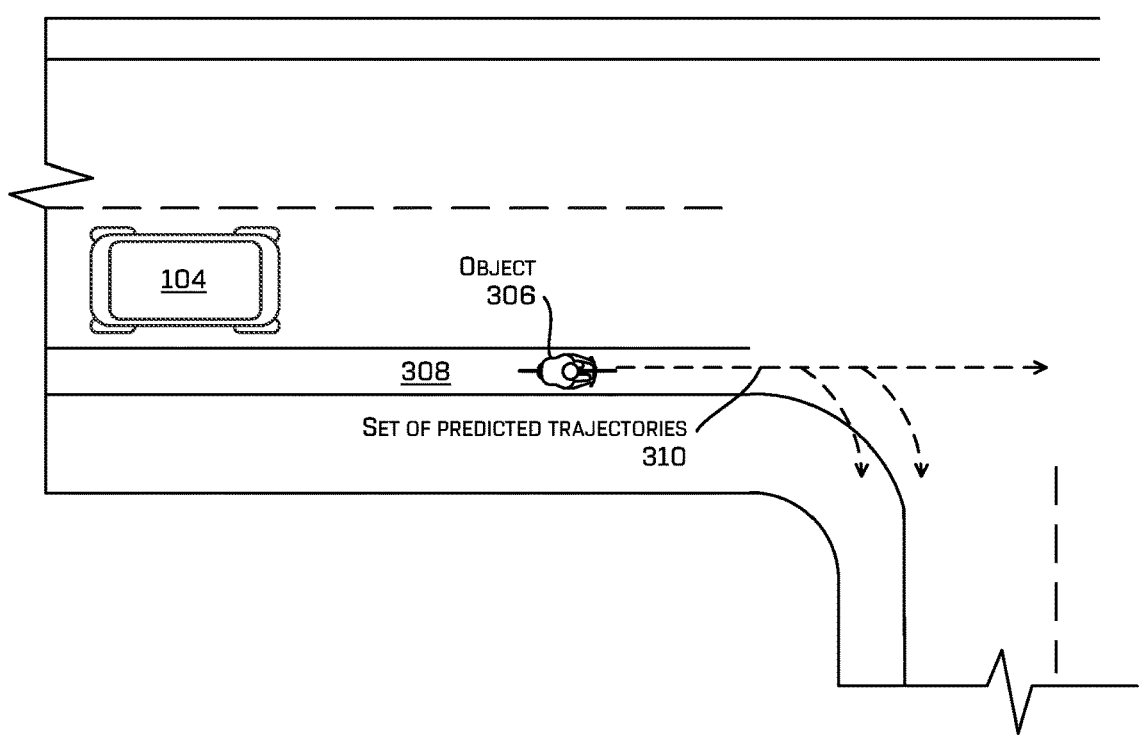

FIG. 3B depicts an example 304 of a vehicle 104 traversing an environment and that includes a T junction. In the environment, the vehicle 104 can detect an object 306 which can be a bicyclist traversing the environment in a bicycle lane 308. Based at least in part on the bicyclist classification of the object 306, the vehicle 104 can determine the set of predicted trajectories 310 which can include the object 108 proceeding straight through the junction, performing a right turn at the junction onto a sidewalk, or performing a right turn at the junction onto a drivable region. As discussed above, the vehicle 104 can determine the set of predicted trajectories 310 based at least in part on the map data by determining that the object 108 will traverse along drivable regions of the environment or walkable regions of the environment (e.g., a sidewalk).

Figure 3C:
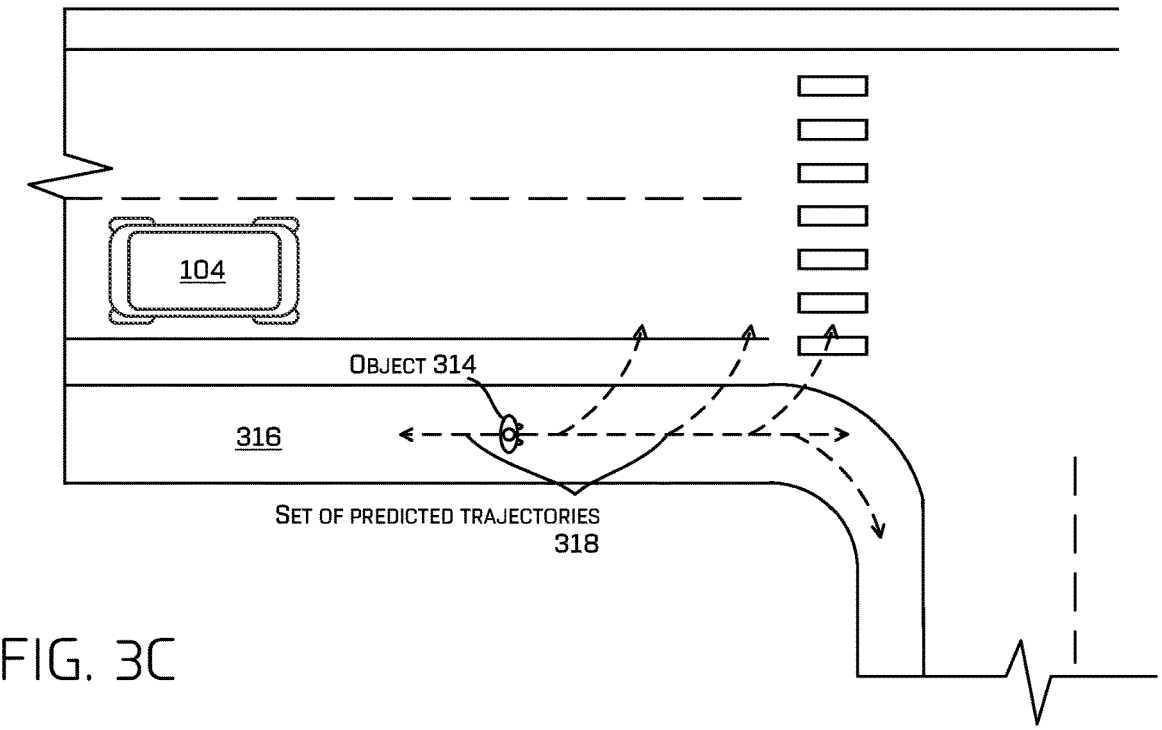

FIG. 3C depicts an example 312 of a vehicle 104 traversing an environment and that includes a T junction. In the environment, the vehicle 104 can detect an object 314 which can be a pedestrian traversing the environment on a sidewalk 316. Based at least in part on the pedestrian classification of the object 306, the vehicle 104 can determine the set of predicted trajectories 318 which can include the object 108 proceeding straight through the junction, performing a right turn at the junction and continuing on sidewalk 316, or performing a left turn at various points by jaywalking across a road or crossing at a crosswalk. As discussed above, the vehicle 104 can determine the set of predicted trajectories 318 based at least in part on the map data by determining that the object 108 will traverse along walkable regions of the environment (e.g., a sidewalk).

Figure 3D:
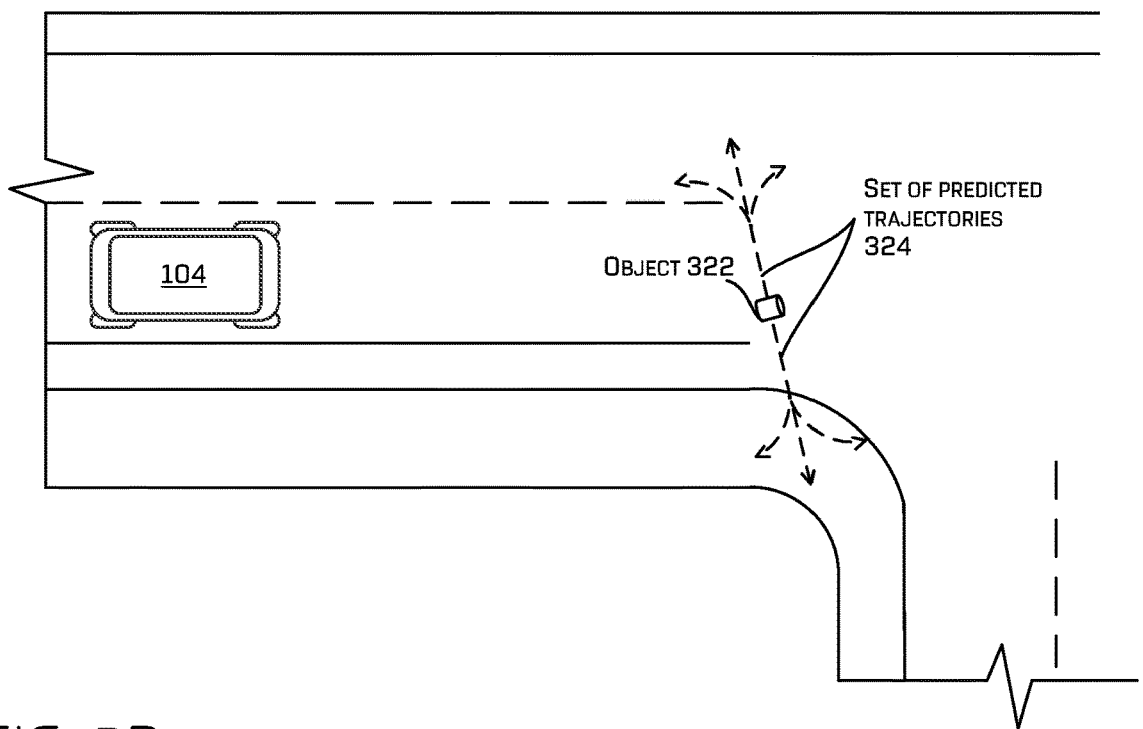

FIG. 3D depicts an example 320 of a vehicle 104 traversing an environment and that includes a T junction. In the environment, the vehicle 104 can detect an object 322 which can be a debris (e.g., a paint can) along a drivable region of the environment. Based at least in part on the debris classification of the object 306, the vehicle 104 can determine the set of predicted trajectories 324 which can include the object 108 rolling along the surface of the drivable region. As discussed above, the vehicle 104 can determine the set of predicted trajectories 318 based at least in part on the map data and/or sensor by determining a tilt of the surface of the drivable region and/or a weather condition (e.g., wind) that can affect the trajectory of the object 322.

Figure 4:
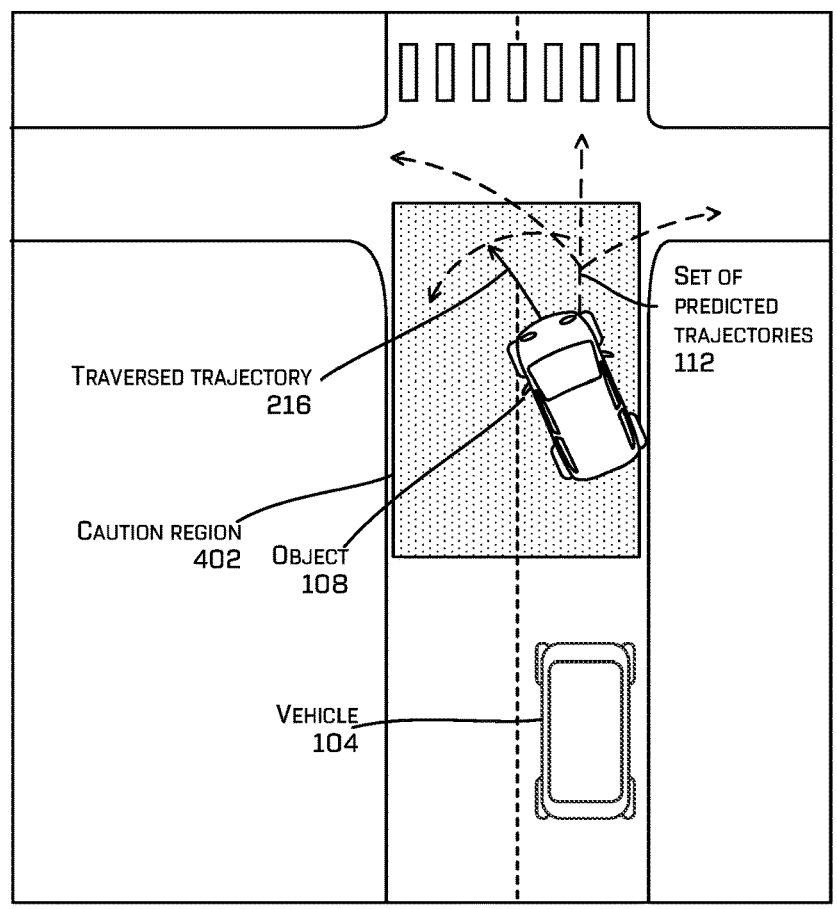
FIG. 4 depicts an example environment of a vehicle determining a caution region based at least in part on the uncertainty metric.

FIG. 4 depicts an example environment 400 of a vehicle determining a caution region 402 based at least in part on the uncertainty metric. As discussed above, a vehicle 104 can traverse an environment and detect an object 108 and, in some instances, a classification associated with the object 108. In some instances, the vehicle 104 can, based at least in part on the classification of the object 108, sensor data, attribute data, map data, environment data, capability data, and the like, determine the set of predicted trajectories 112 and/or a set of confidence metrics associated with the set of predicted trajectories 112. In some instances, the vehicle 104 can determine the traversed trajectory 216 which can differ from the set of predicted trajectories 112. Based at least in part on the set of predicted trajectories 112, the set of confidence metrics, and/or the traversed trajectory 216, the vehicle 104 can determine an uncertainty metric associated with the object 108.

In some instances, the vehicle 104 can, based at least in part on the uncertainty metric, determine a caution region 402 that is adjacent to the object 108. By way of example and without limitation, the vehicle 104 can determine that the object 108 is an uncertain object and/or determine that the uncertainty metric associated with the object 108 meets or exceeds an uncertainty metric threshold. Based on the determination, the vehicle 104 can determine a caution region 402 such that the vehicle 104 avoids traversing near the caution region 402 to prevent a collision with the object 108. In some instances, the vehicle 104 can determine the caution region 402 based at least in part on map data. For example, the map data can indicate portions of an environment that are walkable regions, bicycle regions, bus regions, non-drivable regions, drivable regions, and the like. The vehicle 104 can, based on the map data, determine a portion of the drivable regions represented in the map data as the caution region 402.

In some instances, as the object 108 continues to traverse the environment, the caution region 402 can follow the object 108. In some instances, the vehicle 104 can determine an updated uncertainty metric and an updated caution region 402 that can have an updated contour compared to the initial caution region. In at least some examples, the vehicle 104 may attempt to perform a safe stop maneuver in response to determining there is an unpredictable agent, if the uncertainty meets or exceeds some threshold for any predicted trajectory, or the uncertainty metric meets or exceeds some threshold.

In some instances, the vehicle 104 can generate a vehicle trajectory, which can be a target trajectory within a drivable region of the environment, in accordance with the embodiments discussed herein. The vehicle trajectory can, for example, include a lane change action, a stop action, a reduce speed action, and the like to avoid the caution region 402.

In some instances, the vehicle 104 can determine a cost associated with the object 108. For example, the cost can be based at least in part on the uncertainty metric where a larger uncertainty metric can cause a larger cost to be associated with the object 108. In some instances, the caution region 402 can be based at least in part on the cost determined by the vehicle 104. In some instances, the cost can be an obstacle that can comprise a cost associated with a distance between a point on the reference trajectory or the target trajectory and a point associated with an obstacle in the environment. By way of example, the point associated with the obstacle can correspond to a point associated with the obstacle in the environment.

As discussed above, the vehicle 104 can determine a vehicle trajectory which, in some instances, can include an action to avoid the caution region 402 and/or a cost. Thus, an action can be selected or determined based on costs associated with each action. Examples of determining costs associated with actions can be found, for example, in U.S. patent application Ser. No. 15/843,512 titled "Trajectory Generation Using Curvature Segments" and filed Dec. 14, 2018, which is hereby incorporated by reference, in its entirety.

In some instances, the vehicle 104 can be configured to detect a safety concern based at least in part on the uncertainty metric, the caution region 402, and/or the cost and transmit a request to a remote computing device associated with a teleoperator. The teleoperator can assess the situation and provide guidance to the vehicle 104. After receiving the guidance (and/or a command, in general), the vehicle 104 can continue operation in order to achieve a safe outcome in response to the event of interest. For example, the object 108 can traverse the environment in a manner such that the uncertainty metric meets or exceeds an uncertainty metric threshold, that the caution region 402 meets or exceeds a caution region size threshold, or that the cost meets or exceeds a cost threshold and a teleoperator can provide the guidance to respond to the object 108.

Figure 5:
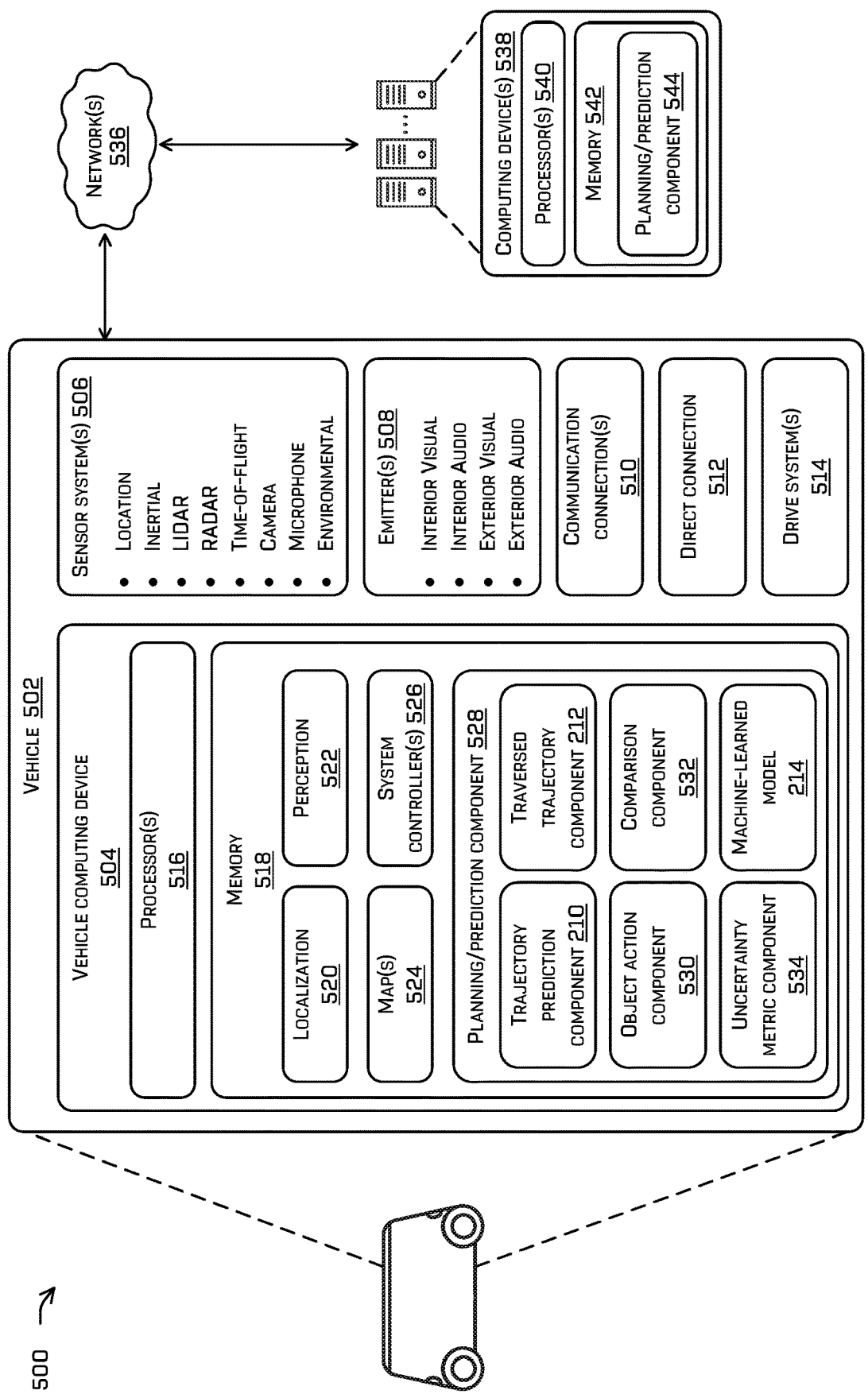
FIG. 5 depicts a block diagram of an example system for implementing the techniques described herein.

FIG. 5 depicts a block diagram of an example system 500 for implementing the techniques described herein. In at least one example, the system 500 can include a vehicle 502.

The vehicle 502 can include a vehicle computing device 504, sensor system(s) 506, emitter(s) 508, communication connection(s) 510, at least one direct connection 512, and drive system(s) 514.

The vehicle computing device 504 can include processor(s) 516 and memory 518 communicatively coupled with the processor(s) 516. In the illustrated example, the vehicle 502 is an autonomous vehicle; however, the vehicle 502 can be any other type of vehicle. In the illustrated example, the memory 518 of the vehicle computing device 504 stores a localization component 520, a perception component 522, map(s) 524, system controller(s) 526, and a planning/prediction component 528 comprising the trajectory prediction component 210, the traversed trajectory component 212, an object action component 530, a comparison component 532, an uncertainty metric component 534, and the machine-learned model 214. Though depicted in FIG. 5 as residing in memory 518 for illustrative purposes, it is contemplated that the localization component 520, the perception component 522, the map(s) 524, the system controller(s) 526, the planning/prediction component 528, the trajectory prediction component 210, the traversed trajectory component 212, the object action component 530, the comparison component 532, the uncertainty metric component 534, and the machine-learned model 214 may additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data, as discussed herein.

In some instances, the perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, unknown, etc.). In additional or alternative examples, the perception component 522 can provide processed sensor data that indicates one or more characteristics (also referred to as attributes) associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The memory 518 can further include map(s) 524 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In some examples, a map may include covariances of data (e.g., lidar data) represented in a multi-resolution voxel space. In at least one example, the map(s) 524 can include at least one map (e.g., images and/or a mesh). In some examples, the vehicle 502 can be controlled based at least in part on the map(s) 524. That is, the map(s) 524 can be used in connection with the trajectory prediction component 210, the localization component 520, the perception component 522, and/or the planning/prediction component 528 to determine a location of the vehicle 502, identify objects in an environment, and/or generate routes and/or trajectories to navigate within an environment.

In some examples, the map(s) 524 can be stored on a remote computing device(s) (such as the computing device(s) 538) accessible via network(s) 536. In some examples, multiple maps 524 can be stored based on, for example, a characteristic (e.g., type of entity, time of day, day of week, season of the year, etc.). Storing multiple maps 524 can have similar memory requirements, but increase the speed at which data in a map can be accessed.

In at least one example, the vehicle computing device 504 can include system controller(s) 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502.

In general, the planning/prediction component 528 can determine a path for the vehicle 502 to follow to traverse through an environment. For example, the planning/prediction component 528 can determine various routes and trajectories and various levels of detail. For example, the planning/prediction component 528 can determine a route to travel from a first location (e.g., a current location) to a second location (e.g., a target location). For the purpose of this discussion, a portion of a route can include a lane change action from a current lane to a target lane. Further, the planning/prediction component 528 can generate an instruction for guiding the autonomous vehicle along at least a portion of the route from the current lane to the target lane. In some examples, the instruction can be a trajectory, or a portion of a trajectory. In some examples, multiple trajectories (e.g., multiple lane change actions associated with multiple target lanes) can be substantially simultaneously generated (e.g., within technical tolerances) in accordance with a receding horizon technique, wherein one of the multiple trajectories is selected for the vehicle 502 to navigate.

In some instances, the planning/prediction component 528 can include functionality to generate predicted trajectories of objects in an environment. For example, the planning/prediction component 528 can generate one or more predicted trajectories for vehicles, pedestrians, animals, and the like within a threshold distance from the vehicle 502. In some instances, the planning/prediction component 528 can measure a track of an object and generate a trajectory for the object based on observed and predicted behavior. Examples of generating predicted trajectories are discussed in U.S. patent application Ser. No. 16/151,607, filed Oct. 4, 2018 and Ser. No. 15/982,658, filed May 17, 2018. Application Ser. Nos. 16/151,607 and 15/982,658 are herein incorporated by reference, in their entirety.

In some instances, the trajectory prediction component 210 can include the functionality to generate the prediction of trajectories of an object in the environment For example, the trajectory prediction component 210 can receive sensor data from the sensor system(s) 506 and/or can receive information about objects in the environment from the perception component 522. Based at least in part on the sensor data and/or on information associated with the objects (e.g., location, pose, extent, classification, velocity, capability, attributes, etc.) the trajectory prediction component 210 can determine a set of predicted trajectories associated with the object.

The traversed trajectory component 212 can include functionality to determine a traversed trajectory of an object. For example, the traversed trajectory component 212 can receive initial sensor data from sensor system(s) 506 at a first time and receive additional sensor data at a second time after the first time. The initial sensor data and the additional sensor data can indicate, among other types of data, a first position of the object and a second position of the object. Based at least in part on the first position and the second position, the traversed trajectory component 212 can determine a traverse trajectory that is associated with the object.

The object action component 530 can determine an action associated with the traversed trajectory of the object. For example, the object action component 530 can determine that the traversed trajectory of the object has violated a driving rule. In some instances, the object action component 530 can determine that the object has enabled an indicator that is inconsistent with an action taken by the object (e.g., enabled a left turn indicator and performed a right turn). In some instances, the object action component 530 can determine that the object is traversing along a portion of the environment that is inconsistent with a classification of the object (e.g., a vehicle driving on a sidewalk). In some instances, the object action component 530 can determine that the object has exceeded an acceleration threshold (e.g., exceeded a comfort threshold). These are merely several examples and other suitable actions are contemplated. These actions can be used to determine the uncertainty metric discussed above and below.

The comparison component 532 can include functionality to compare the set of predicted trajectories with the traversed trajectory. As discussed above, a difference between the traversed trajectory and the set of predicted trajectories can be used to determine the uncertainty metric. The comparison component 532 can determine a magnitude of a difference using, for example, an algorithm that compares an area of a curve defined by the trajectory although other suitable algorithms are contemplated such as a sum of squares algorithm or a maximum deviation algorithm.

The uncertainty metric component 534 can receive the set of predicted trajectories, the set of confidence metrics, the object actions, and/or the difference between the traversed trajectory and the set of predicted trajectories to determine the uncertainty metric.

In some instances, the machine-learned model 214 can include functionality to receive, as input, the sensor data and/or the attribute data and output the uncertainty metric associated with an object in the environment. The machine-learned model 214 can be implemented as a neural network. As discussed above, the machine-learned model 214 can determine the uncertainty metric by, for example, considering the sensor data, the classification of the object, attribute data associated with the object, environment data, capability data, and the like.

In at least one example, the sensor system(s) 506 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the lidar sensors can include individual lidar sensors located at the corners, front, back, sides, and/or top of the vehicle 502. As another example, the camera sensors can include multiple cameras disposed at various locations about the exterior and/or interior of the vehicle 502. The sensor system(s) 506 can provide input to the vehicle computing device 504.

The vehicle 502 can also include one or more emitters 508 for emitting light and/or sound, as described above. The emitters 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 can also include communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include processor(s) and memory communicatively coupled with the one or more processors. The memory can store one or more components to perform various functionalities of the drive system(s) 514. Furthermore, the drive system(s) 514 also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data to the computing device(s) 538. In some examples, the vehicle 502 can send sensor data to the computing device(s) 538 at a particular frequency, after a lapse of a predetermined period of time, in near real-time, etc. In some cases, the vehicle 502 can send sensor data (raw or processed) to the computing device(s) 538 as one or more log files.

The computing device(s) 538 can include processor(s) 540 and a memory 542 storing a planning/prediction component 544.

In some instances, the planning/prediction component 544 can substantially correspond to the planning/prediction component 528 and can include functionality to determine an uncertainty metric associated with an object in an environment. In some examples, memory 542 may additionally or alternatively store any of the trajectory prediction component 210, the traversed trajectory component 212, the object action component 530, the comparison component 532, the uncertainty metric component 534, and/or the machine-learned model 214. For example, the computing device(s) 538 can determine the uncertainty metric based at least in part on log data received from one or more vehicles and may transmit the uncertainty metric to one or more vehicles.

The processor(s) 516 of the vehicle 502 and the processor(s) 540 of the computing device(s) 538 can be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 540 are examples of non-transitory computer-readable media. The memory 518 and 540 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 518 and 540 can include at least a working memory and a storage memory. For example, the working memory may be a high-speed memory of limited capacity (e.g., cache memory) that is used for storing data to be operated on by the processor(s) 516 and 538. In some instances, the memory 518 and 540 can include a storage memory that may be a lower-speed memory of relatively large capacity that is used for long-term storage of data. In some cases, the processor(s) 516 and 538 cannot operate directly on data that is stored in the storage memory, and data may need to be loaded into a working memory for performing operations based on the data, as discussed herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

Figure 6:
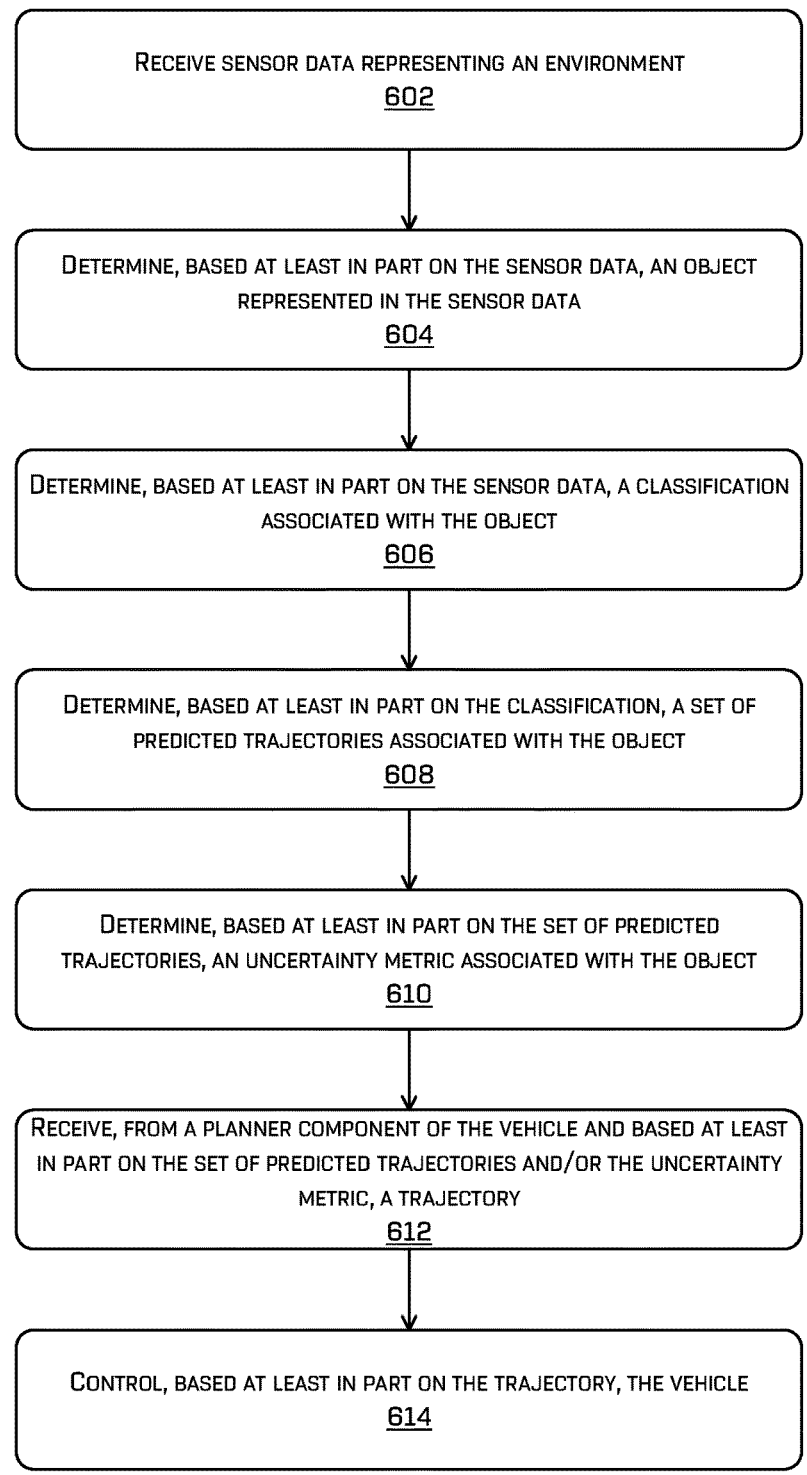
FIG. 6 depicts a flow diagram of an example process for determining the uncertainty metric and controlling a vehicle based at least in part on the uncertainty metric, in accordance with examples of the disclosure.
Figure 7:
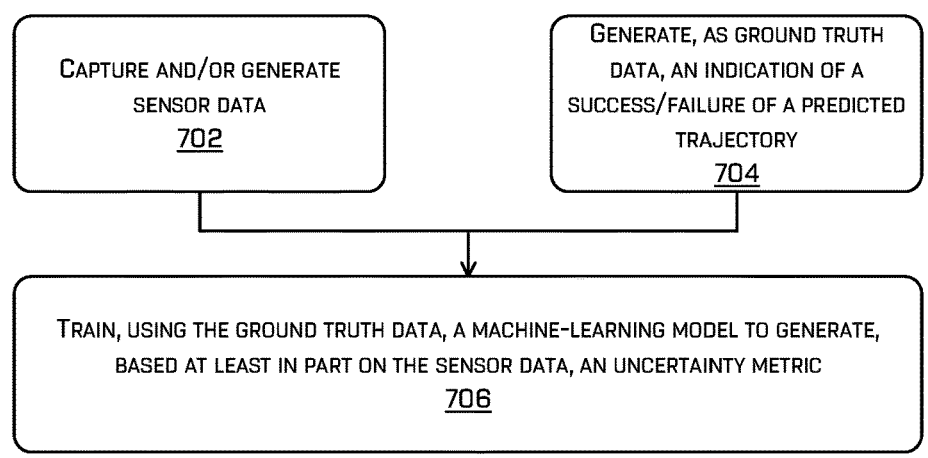
FIG. 7 depicts a flow diagram of an example process for training a machine-learning model to determine the uncertainty metric based at least in part on captured/generated sensor data and ground truth data, in accordance with examples of the disclosure.

FIGS. 6 and 7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 depicts an example process 600 for determining an uncertainty metric and controlling, based at least in part on the uncertainty metric, the vehicle, in accordance with embodiments of the disclosure. For example, some or all of the process 600 can be performed by one or more components in FIG. 2 or 5, as described herein. For example, some or all of the process 600 can be performed by the vehicle computing device(s) 206, the vehicle computing device 504, and/or computing device(s) 538.

At operation 602 of example process 600, the process 600 can include receiving, from a sensor of a vehicle, sensor data representing at least a portion of an environment. In some instances, the vehicle can be stationary and/or parked in the environment. In some instances, the vehicle can be traversing the environment while receiving, from the sensor, the sensor data.

At operation 604 of example process 600, the process 600 can include determining, based at least in part on the sensor data, an object represented in the sensor data. As discussed above, the vehicle can perform object detection, and/or segmentation based at least in part on the sensor data received from the sensor to determine that the sensor data represents an object.

At operation 606 of example process 600, the process 600 can include determining, based at least in part on the sensor data, a classification associated with the object. In some instances, the sensor data can be converted into a top-down representation of the environment.

At operation 608 of example process 600, the process 600 can include determining, based at least in part on the classification, a set of predicted trajectories associated with the object. As discussed above, the set of predicted trajectories can be based on the classification of the object. By way of example and without limitation, the computing device can determine that an object is another vehicle such as a truck. Based on a pose and/or a velocity of the truck, the computing device can determine a set of predicted trajectories that the truck can possibly follow.

In some instances, a machine-learned model can receive the sensor data, the environment data, the map data, the attribute data, and/or the capability data, and output, from the machine-learned model, the set of predicted trajectories and/or the set of confidence metrics associated with the set of predicted trajectories.

At operation 610 of example process 600, the process 600 can include determining, based at least in part on the set of predicted trajectories, an uncertainty metric associated with the object. By way of example and without limitation, a computing device can compare the set of confidence metrics with a confidence metric threshold. If none of the individual confidence metrics meets or exceeds the confidence metric threshold, the computing device can determine an uncertainty metric with a high value and associate the uncertainty metric with the high value with the object. However, other suitable techniques for determining the uncertainty metric are contemplated. For example, in some instances, the computing device can input, into a machine-learned model, the set of predicted trajectories and/or the set of confidence metrics and receive from the machine-learned model the uncertainty metric.

At operation 612 of example process 600, the process 600 can include receiving, from a planner component of the vehicle and based at least in part on the set of predicted trajectories and/or the uncertainty metric, a trajectory. For example, the planner component can, based at least in part on the set of predicted trajectories and/or the uncertainty metric, determine a cost associated with the object. In some instances, the planner component can determine, based on the cost, a caution region that is associated with the object and determine a trajectory that avoids the caution region. In some instances, the trajectory can reduce a velocity of the vehicle if the vehicle enters the caution region. In some instances, the trajectory can include stopping within a threshold distance of the object.

In some instances, the operation 612 can include determining whether the uncertainty metric meets or exceeds an uncertainty metric threshold. If the uncertainty metric does not meet or exceed the uncertainty metric threshold, then the planner component can determine a trajectory based on the sensor data. If the uncertainty metric does meet or exceed the uncertainty metric threshold, then the planner component can determine a trajectory based at least in part on the uncertainty metric and/or the caution region. In some instances, the uncertainty metric can be associated with a cost. For example, a lower uncertainty metric can be associated with a lower uncertainty associated with the object and, in turn, can be associated with a lower cost associated with the object. Likewise, a higher uncertainty metric can be associated with a higher uncertainty associated with the object and, in turn, can be associated with a higher cost associated with the object. As discussed above, in some instances, a cost can be used to determine the caution region that is adjacent to the object.

At operation 614 of example process 600, the process 600 can include controlling, based at least in part on the trajectory, the vehicle. For example, the vehicle can determine a caution region based at least in part on the uncertainty metric and/or a cost associated with the object. Based at least in part on the caution region, controlling the vehicle can include determining a trajectory that avoids the caution region, maintains a safe distance from the uncertain object, reduces a velocity of the vehicle in the caution region, and/or stops the vehicle within a threshold distance of the object.

FIG. 7 depicts an example process 700 for training a machine-learning model to generate an uncertainty metric.

At operation 702 of example process 700, the process 700 can capture and/or generate sensor data and determine attribute data therefrom, wherein the attribute data can be associated with an object in a database stored in a memory of the vehicle. The attribute data can include attributes associated with the object and/or the environment (e.g., an indicator status of an object, a velocity of the object, a weather condition, etc.) In some instances, the sensor data can be captured by one or more vehicles while traversing an environment. In some instances, the sensor data can be synthetic sensor data that is generated in a simulation environment.

At operation 704 of example process 700, the process 700 can include generating an indication of a success or a failure of a predicted trajectory as ground truth data. The ground truth data can indicate whether an object traversed along a trajectory predicted by a vehicle. In some instances, the ground truth data can be manually labeled and/or determined from other, validated, machine-learned components and indicate objects as uncertain objects.

At operation 706 of example process 700, the sensor data can be input into the machine-learning model to generate an uncertainty metric. The machine-learning model can be trained to generate the uncertainty metric based at least in part on the sensor data and the ground truth data. For example, the sensor data can be input to a machine-learning model where a known result (e.g., the ground truth data indicating a successful or failed prediction) can be used to adjust weights and/or parameters of the machine-learning model to minimize an error. In some instances, the ground truth data can be labeled sensor data and/or attribute data. In some instances, the ground truth data can be synthetic sensor data. As discussed above, the machine-learning model can use loss functions (e.g., L1, L2, softmax, etc.) to minimize the error. Such a model may be one or more of a linear or logistic regression, or otherwise.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures can be used to implement the described functionality and are intended to be within the scope of this disclosure. Furthermore, although specific distributions of responsibilities are defined above for purposes of discussion, the various functions and responsibilities might be distributed and divided in different ways, depending on circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

EXAMPLE CLAUSES

A: A system comprising: one or more processors; and one or more non-transitory computer-readable media storing computer-executable instructions that, when executed, cause the system to perform operations comprising: receiving, from a sensor associated with an autonomous vehicle, sensor data representing an environment; determining, based at least in part on the sensor data, an object represented in the sensor data; determining, based at least in part on the sensor data, a set of predicted trajectories associated with the object and a set of confidence metrics associated with the object, wherein an individual predicted trajectory of the set of predicted trajectories is associated with an individual confidence metric of the set of confidence metrics; determining, based at least in part on the set of predicted trajectories and the set of confidence metrics, an uncertainty metric associated with the object indicating an uncertainty associated with a future trajectory of the object; and controlling, based at least in part on the uncertainty metric, the autonomous vehicle.

B: The system of paragraph A, wherein determining the set of predicted trajectories and the set of confidence metrics comprises: inputting a top down representation of the environment into a machine-learned model; and receiving, from the machine-learned model, the set of predicted trajectories and the set of confidence metrics.

C: The system of paragraph A, the operations further comprising: determining, based at least in part on the sensor data, at least one of: a velocity confidence metric associated with a velocity of the object; a pose confidence metric associated with a pose of the object; or a classification confidence metric associated with a classification of the object; wherein, determining the uncertainty metric is further based at least in part on at least one of the velocity confidence metric, the pose confidence metric, or the classification confidence metric.

D: The system of paragraph A, the operations further comprising: receiving additional sensor data; and determining, based at least in part on the sensor data and the additional sensor data, a traversed trajectory associated with the object; wherein determining the uncertainty metric is further based at least in part on a difference between the traversed trajectory and the individual predicted trajectory.

E: The system of paragraph D, the operations further comprising: determining an action associated with the traversed trajectory, the action comprising at least one of: violating a driving rule, enabling a lighting indicator that is inconsistent with the traversed trajectory, traversing a portion of the environment that is not associated with driving, or exceeding an acceleration threshold; wherein determining the uncertainty metric is further based at least in part on the action.

F: A method comprising: receiving, from a sensor associated with an autonomous vehicle, sensor data of an environment; determining, based at least in part on the sensor data, a predicted trajectory associated with an object in the environment, the predicted trajectory associated with a confidence metric; determining, based at least in part on the confidence metric, that the object is an uncertain object; and controlling, based at least in part on determining that the object is the uncertain object, the autonomous vehicle.

G: The method of paragraph F, wherein controlling the autonomous vehicle comprises: determining a caution region in the environment that is associated with the object; determining, based at least in part on the caution region, a trajectory; and controlling, based at least in part on the trajectory, the autonomous vehicle.

H: The method of paragraph G, wherein determining the caution region comprises: determining, based at least in part on determining that the object is the uncertain object, a cost associated with the object; wherein a contour of the caution region is based at least in part on the cost.

I: The method of paragraph F, wherein determining the object is an uncertain object is further based at least in part inputting the one or more of the confidence or the predicted trajectory into a machine learned model and receiving, from the model, the confidence, wherein the model is trained, based at least in part on training data and ground truth data indicative of an uncertain object, a machine-learned model; and wherein determining that the object is an uncertain object comprises receiving, from the machine-learned model an uncertainty metric associated with the object.

J: The method of paragraph F, wherein determining that the object is the uncertain object comprises: inputting the predicted trajectory and environment data into a machine-learned model, the environment data indicating at least one of: a time of day; a day of a week; a holiday; a weather condition; or region data indicating a region of the environment associated with the predicted trajectory; receiving, from the machine-learned model, an uncertainty metric; and determining that the uncertainty metric meets or exceeds an uncertainty metric threshold.

K: The method of paragraph F, wherein determining the predicted trajectory comprises: inputting a top down representation of the environment into a machine-learned model; and receiving, from the machine-learned model, the predicted trajectory.

L: The method of paragraph F, wherein determining the predicted trajectory comprises: determining a classification associated with the object; inputting the classification and data based at least in part on the sensor data into a machine-learned model; and receiving, from the machine-learned model, at least one of the predicted trajectory or an uncertainty metric associated with the object.

M: One or more non-transitory computer-readable media storing instructions executable by one or more processors, wherein the instructions, when executed, cause the one or more processors to perform operations comprising: receiving, from a sensor associated with an autonomous vehicle, sensor data of an environment; determining, based at least in part on the sensor data, a predicted trajectory associated with an object in the environment, the predicted trajectory associated with a confidence metric; determining, based at least in part on the confidence metric, that the object is an uncertain object; and controlling, based at least in part on determining that the object is the uncertain object, the autonomous vehicle.

N: The one or more non-transitory computer-readable media of paragraph M, wherein controlling the autonomous vehicle comprises: determining a caution region in the environment that is associated with the object; determining, based at least in part on the caution region, a trajectory; and controlling, based at least in part on the trajectory, the autonomous vehicle.

O: The one or more non-transitory computer-readable media of paragraph N, wherein determining the caution region comprises: determining, based at least in part on determining that the object is the uncertain object, a cost associated with the object; wherein a contour of the caution region is based at least in part on the cost.

P: The one or more non-transitory computer-readable media of paragraph M, the operations further comprising: training, based at least in part on training data and ground truth data indicative of an uncertain object, a machine-learned model; wherein the ground truth data is based at least in part on manually labeled data; and wherein determining that the object is an uncertain object comprises receiving, from the machine-learned model an uncertainty metric associated with the object.

Q: The one or more non-transitory computer-readable media of paragraph M, wherein determining that the object is the uncertain object: inputting the predicted trajectory and environment data into a machine-learned model, the environment data indicating at least one of: a time of day; a day of a week; a holiday; a weather condition; or region data indicating a region of the environment associated with the predicted trajectory; receiving, from the machine-learned model, an uncertainty metric; and determining that the uncertainty metric meets or exceeds an uncertainty metric threshold.

R: The one or more non-transitory computer-readable media of paragraph M, wherein the determining the predicted trajectory comprises: inputting a top down representation of the environment into a machine-learned model; and receiving, from the machine-learned model, the predicted trajectory.

S: The one or more non-transitory computer-readable media of paragraph M, wherein determining the predicted trajectory comprises: determining a classification associated with the object; inputting the classification and data based at least in part on the sensor data into a machine-learned model; and receiving, from the machine-learned model, at least one of the predicted trajectory or an uncertainty metric associated with the object.

T: The one or more non-transitory computer-readable media of paragraph M, the operations further comprising: receiving additional sensor data; and determining, based at least in part on the sensor data and the additional sensor data, a traversed trajectory associated with the object; wherein determining that the object is the uncertain object is further based at least in part on a difference between the traversed trajectory and the predicted trajectory.

While the example clauses described above are described with respect to one particular implementation, it should be understood that, in the context of this document, the content of the example clauses can also be implemented via a method, device, system, computer-readable medium, and/or another implementation.

Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the system to perform operations comprising:
receiving, from a sensor associated with an autonomous vehicle, sensor data representing an environment;
determining, based at least in part on the sensor data, an object represented in the sensor data;
determining, based at least in part on the sensor data, a set of predicted trajectories associated with the object and a set of confidence metrics associated with the object, wherein an individual predicted trajectory of the set of predicted trajectories is associated with an individual confidence metric of the set of confidence metrics;
determining, based at least in part on the set of predicted trajectories and the set of confidence metrics, an uncertainty metric associated with the object representing a degree to which the object is behaving unpredictably; and
controlling, based at least in part on the uncertainty metric, the autonomous vehicle.

2. The system of claim 1, wherein determining the set of predicted trajectories and the set of confidence metrics comprises:
inputting a top down representation of the environment into a machine-learned model; and
receiving, from the machine-learned model, the set of predicted trajectories and the set of confidence metrics.

3. The system of claim 1, the operations further comprising:
determining, based at least in part on the sensor data, at least one of:
a velocity confidence metric associated with a velocity of the object;
a pose confidence metric associated with a pose of the object; or
a classification confidence metric associated with a classification of the object;
wherein, determining the uncertainty metric is further based at least in part on at least one of the velocity confidence metric, the pose confidence metric, or the classification confidence metric.

4. The system of claim 1, the operations further comprising:
receiving additional sensor data; and
determining, based at least in part on the sensor data and the additional sensor data, a traversed trajectory associated with the object;
wherein determining the uncertainty metric is further based at least in part on a difference between the traversed trajectory and the individual predicted trajectory.

5. The system of claim 4, the operations further comprising:
determining an action associated with the traversed trajectory, the action comprising at least one of:
violating a driving rule,
enabling a lighting indicator that is inconsistent with the traversed trajectory,
traversing a portion of the environment that is not associated with driving, or
exceeding an acceleration threshold;
wherein determining the uncertainty metric is further based at least in part on the action.

6. A method comprising:
receiving, from a sensor associated with an autonomous vehicle, sensor data of an environment;
determining, based at least in part on the sensor data, a predicted trajectory associated with an object in the environment, the predicted trajectory associated with a confidence metric;
determining, based at least in part on the predicted trajectory and the confidence metric, an uncertainty metric associated with the object representing a degree to which the object is behaving unpredictably;
determining, based at least in part on the uncertainty metric, that the object is an uncertain object; and
controlling, based at least in part on determining that the object is the uncertain object, the autonomous vehicle.

7. The method of claim 6, wherein controlling the autonomous vehicle comprises:
determining a caution region in the environment that is associated with the object;
determining, based at least in part on the caution region, a trajectory; and
controlling, based at least in part on the trajectory, the autonomous vehicle.

8. The method of claim 7, wherein determining the caution region comprises:
determining, based at least in part on determining that the object is the uncertain object, a cost associated with the object;
wherein a contour of the caution region is based at least in part on the cost.

9. The method of claim 6, wherein determining the object is an uncertain object is further based at least in part inputting the one or more of the confidence or the predicted trajectory into a machine learned model and receiving, from the model, the confidence,
wherein the model is trained, based at least in part on training data and ground truth data indicative of an uncertain object, a machine-learned model; and
wherein determining that the object is an uncertain object comprises receiving, from the machine-learned model an uncertainty metric associated with the object.

10. The method of claim 6, wherein determining that the object is the uncertain object comprises:
inputting the predicted trajectory and environment data into a machine-learned model, the environment data indicating at least one of:
a time of day;
a day of a week;
a holiday;
a weather condition; or
region data indicating a region of the environment associated with the predicted trajectory;
receiving, from the machine-learned model, an uncertainty metric; and determining that the uncertainty metric meets or exceeds an uncertainty metric threshold.

11. The method of claim 6, wherein determining the predicted trajectory comprises:
inputting a top down representation of the environment into a machine-learned model; and
receiving, from the machine-learned model, the predicted trajectory.

12. The method of claim 6, wherein determining the predicted trajectory comprises:
determining a classification associated with the object;
inputting the classification and data based at least in part on the sensor data into a machine-learned model; and
receiving, from the machine-learned model, at least one of the predicted trajectory or an uncertainty metric associated with the object.

13. One or more non-transitory computer-readable media storing instructions executable by one or more processors, wherein the instructions, when executed, cause the one or more processors to perform operations comprising:
receiving, from a sensor associated with an autonomous vehicle, sensor data of an environment;
determining, based at least in part on the sensor data, a predicted trajectory associated with an object in the environment, the predicted trajectory associated with a confidence metric;
determining, based at least in part on the predicted trajectory and the confidence metric, an uncertainty metric associated with the object representing a degree to which the object is behaving unpredictably;
determining, based at least in part on the confidence metric, that the object is an uncertain object; and
controlling, based at least in part on determining that the object is the uncertain object, the autonomous vehicle.

14. The one or more non-transitory computer-readable media of claim 13, wherein controlling the autonomous vehicle comprises:
determining a caution region in the environment that is associated with the object;
determining, based at least in part on the caution region, a trajectory; and
controlling, based at least in part on the trajectory, the autonomous vehicle.

15. The one or more non-transitory computer-readable media of claim 14, wherein determining the caution region comprises:
determining, based at least in part on determining that the object is the uncertain object, a cost associated with the object;
wherein a contour of the caution region is based at least in part on the cost.

16. The one or more non-transitory computer-readable media of claim 13, the operations further comprising:
training, based at least in part on training data and ground truth data indicative of an uncertain object, a machine-learned model;
wherein the ground truth data is based at least in part on manually labeled data; and
wherein determining that the object is an uncertain object comprises receiving, from the machine-learned model an uncertainty metric associated with the object.

17. The one or more non-transitory computer-readable media of claim 13, wherein determining that the object is the uncertain object:
inputting the predicted trajectory and environment data into a machine-learned model, the environment data indicating at least one of:
a time of day;
a day of a week;
a holiday;
a weather condition; or
region data indicating a region of the environment associated with the predicted trajectory;
receiving, from the machine-learned model, an uncertainty metric; and
determining that the uncertainty metric meets or exceeds an uncertainty metric threshold.

18. The one or more non-transitory computer-readable media of claim 13, wherein the determining the predicted trajectory comprises:
inputting a top down representation of the environment into a machine-learned model; and
receiving, from the machine-learned model, the predicted trajectory.

19. The one or more non-transitory computer-readable media of claim 13, wherein determining the predicted trajectory comprises:
determining a classification associated with the object;
inputting the classification and data based at least in part on the sensor data into a machine-learned model; and
receiving, from the machine-learned model, at least one of the predicted trajectory or an uncertainty metric associated with the object.

20. The one or more non-transitory computer-readable media of claim 13, the operations further comprising:
receiving additional sensor data; and
determining, based at least in part on the sensor data and the additional sensor data, a traversed trajectory associated with the object;
wherein determining that the object is the uncertain object is further based at least in part on a difference between the traversed trajectory and the predicted trajectory.

* * * * *